Figure 1:
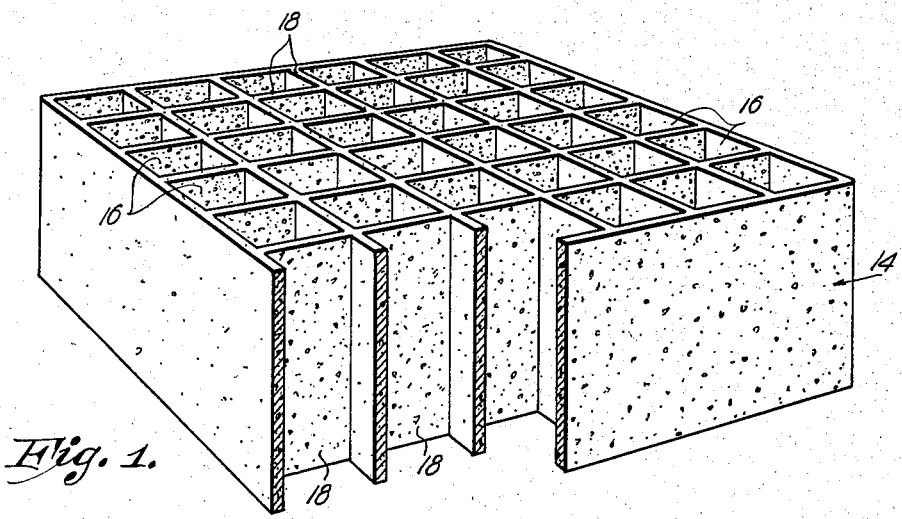

March 10, 1959 R. E. HUNDAHL 2,876,997
LIVESTOCK GATES AND CONSTRUCTION THEREOF
Filed April 16, 1956

INVENTOR.
Robert E. Hundahl
BY Thos. E. Serfield
ATTORNEY.

United States Patent Office 2,876,997
Patented Mar. 10, 1959

2,876,997

LIVESTOCK GATES AND CONSTRUCTION THEREOF

Robert Eugene Hundahl, Tekamah, Nebr.

Application April 16, 1956, Serial No. 578,479

3 Claims. (Cl. 256—14)

This invention relates to the provision of crossing areas designed to prevent the passage of livestock from one side to the other but to permit passage of humans or vehicles and refers more particularly to an improved crossing area and means whereby areas of different length and width may conveniently be formed.

As will be familiar to those having experience with such domestic animals as cattle, it has long been the practice to provide the pens or fields where they are kept with gates which are quite unlike the unconventional barrier-type gates, that is, gates which require opening and closing each time it is desired to pass therethrough. The usual type of livestock gate consists of a series of spaced metal pipes or bars which are supported at ground level above an open pit formed across the span of the gate area. It is a well-known fact that livestock will not proceed across such an arrangement, the openings between the bars or pipes serving to frighten them from making the attempt. However, the bars provide adequate support for humans, who have the ability to pick their way across, and vehicles. Thus the area acts as an effective guard against movement therethrough of the livestock while still permitting passage of humans and vehicles without requiring opening and closing of a conventional gate structure.

All cattle guarding gates of which I have knowledge, however, are open to objection on several major grounds. First, they are designed to fit a specific gate span and area and, consequently, cannot be used where conditions are such that the span may be greater or less than that for which they are designed. Secondly, they are constructed of heavy materials and are so anchored to the ground that once installed they are to all intents and purposes permanent. Third, even of they could be removed from one location, they cannot be moved to another location and again set in place without involving the efforts of several men. Fourth, if assembled on the spot, they require bolting and welding in order to secure the parts together, which necessitates special equipment and tools.

An object of the present invention is to provide an improved cattle guarding gate in which the difficulties outlined above are effectively overcome. In my invention I have done away with the conventional pipes and bars and their connections with an adequate anchoring and supporting assembly. A feature of the invention resides in the fact that my gate is composed of a plurality of self-contained small gate forming units so constructed that there are openings formed therein to discourage passage of livestock, the openings being arranged in a pattern providing intermediate supporting surfaces which will support the weight of humans and vehicles so that the latter can nevertheless proceed thereover. Each unit is so constructed as to provide a fractional part of the total surface area, the units cooperating with one another to provide the full gate area.

Another object of the invention is to provide a gate of the character described in which by virtue of its composite assembly the gate can be adapted to openings of different widths and lengths with ease and facility. The manner of construction of the individual gate forming units is such that they can be combined in any number, depending on the area available.

A further object of the invention is to provide a gate of the character described which is especially adapted for use in temporary situations. The assembly of the gate from a plurality of independent and relatively small units each designed to provide a fractional part of the over-all gate surface permits their easy installation in and removal from a given location by one man.

Another object of the invention is to provide a gate of the character described in which the individual gate forming units are provided with a plurality of openings of a size to receive a hoof of such livestock as the gate is designed to contain but in which the construction of the unit is such that the surface surrounding said opening is firmly supported and is capable of withstanding the weight of heavy vehicles.

Still another object is to provide a gate of the character described which can be manufactured at low cost, can be easily transported from the place to another, is capable of withstanding years of rugged use, and can be repaired quickly and easily by removal of a damaged section and replacing it with a new section without requiring complete removal of the entire gate from the ground.

Other and further objects together with the features of novelty appurtenant thereto will appear during the course of the following description.

Figure 2:
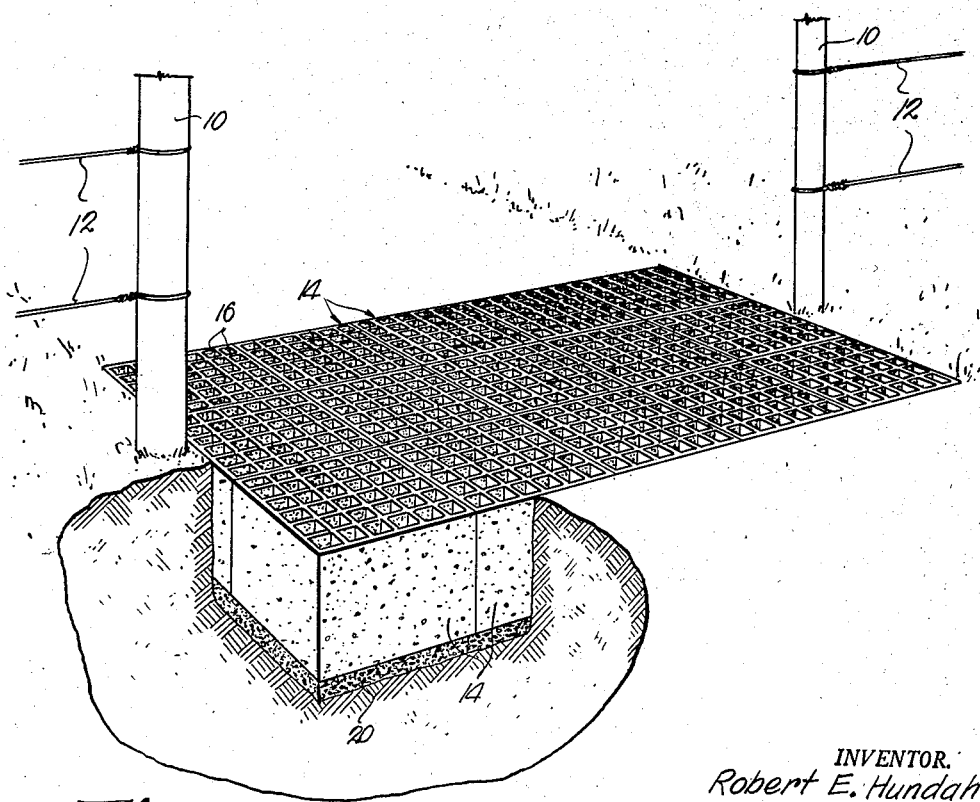

In the accompanying drawing, which forms a part of the instant specification and is to be read in conjunction therewith, and in which like reference numerals indicate like parts in the various views;

Fig. 1 is a perspective view of the preferred form of individual gate forming unit, parts being shown in section for purposes of illustration; and Fig. 2 is a perspective view of a preferred gate embodying a plurality of the gate forming units, the ground being broken away at one corner for purposes of illustration.

Referring to the drawing, in Fig. 2 is illustrated a preferred gate equipped with a livestock guard embodying the features of my invention. Such a guard may be located between pastures and fields, in feeding pens, or wherever else it may be desired to have an entry through a fence or wall which will prevent livestock from passing therethrough but which nevertheless will permit untrammelled passage of humans and/or vehicles. For purposes of illustration, the gate has been shown in connection with a conventional fence having the posts 10 and the fence wires 12, an opening being provided between the posts.

The illustrated livestock guard is made up of a plurality of identical gate-forming units 14, the details of which are shown in Fig. 1. Each unit comprises a rectangular structure provided with a plurality of passageways 16 extending therethrough from top to bottom, the passageways being separated from one another by continuous partitions 18. The units can be manufactured from any suitable stress-bearing material, preferably by molding. Examples of preferable materials are concrete, synthetic resin compounds or hard rubber. It will be understood however, that other materials may be used, the only requirement being that they have sufficient strength to resist the compression created by vehicles which may pass thereover. As will be noted the passageway 16 forms openings in the upper surface of the units which are bounded by the end surfaces of the partitions 18. Each passageway is preferably of a size which will permit entry of the hoof of the particular animal being penned.

In constructing the gate illustrated in Fig. 2, the units 14 are placed in a pit of a depth such that the tops of the units are flush with the surrounding ground surface. If desired, a sand fill 20 can be distributed over the bottom of the pit prior to installation of the gate forming units. Sand fill aids in drainage, providing a porous base surface for absorption of moisture. The units are so placed that they abut one another closely to provide a continuous structure with the ends of the partitions 18 and sidewalls of the units disposed substantially in a common plane.

As will be evident, the sidewalls of the pit terminate adjacent the outside walls of the outermost units 14 in the assembly and serve to hold the assembly together. If after installation of the desired number of units any gap remains between the walls of the pit and the outside units, the gap can be filled and tamped to wedge the assembly together.

In the assembled gate the passageways 16 form a pattern of openings across the entire width and length of the gate surface which are effective to discourage livestock from attempting to cross from one side to the other. The cross-sectional area of the passageway should be relatively great as compared with the visible area of the ends of the partitions so that the open areas will be the predominant visible feature. The interconnection of the partitions with one another and the fact that they extend from top to bottom makes it possible to provide quite narrow partitions which will nevertheless be able to withstand heavy loads without compressive buckling. Each partition acts as stiffener for another and in the preferred unit, where all partitions rest on the base surface of the pit, each partition contributes materially in supporting loads which come in contact therewith. Stated otherwise, in my assembly the partitions are not required to assume any beam stresses, which is not the case in the conventional parallel bar type arrangement.

While I have shown an assembled crossing employing fifteen of the units 14, it will be understood that the number of units can be varied as desired to provide crossing areas of different widths and different lengths. The shape of the crossing can also be varied. For example, L-shape as well as U-shape crossings are possible, it being necessary only to combine the units in such fashion as to produce the desired shape.

It will also be understood that while I have shown square passageways in the units, the shapes of the passageways can be altered without departing from the invention. They can be polygonal, triangular, circular, or rectangular. The only requirement that must be met is that the individual passageways be defined by partitions which present supporting surfaces at their upper ends and which extend through the block.

While the dimensions of the unit can be varied as desired to accommodate different types of livestock, I have found that a block 2 feet square with a height reaching from 8 inches to 1 foot, depending on the type of livestock, is convenient for almost all situations. The size of each opening in the unit should be such as to provide an open circular area from 4 to 8 inches in diameter, the exact diameter again depending on the type of livestock involved and the average hoof size thereof.

From the foregoing it will be evident that I have accomplished all of the ends and objects hereinbefore set forth. The gate is readily portable since it can be removed in sections by one man, loaded on a vehicle and moved to and installed in another location. Should any damage occur to any one of the individual units, it can be removed and replaced without disturbing the rest of the assembly.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A livestock guard comprising a box-like element of considerable height having peripheral walls and intersecting partitions dividing said element into a plurality of vertically arranged passageways, the cross-sectional area of each passageway being larger than that of the hoof of the livestock to be restrained thereby.

2. In a crossing guard for livestock, the combination of a substantially flat base surface, a plurality of similar independent block-like guard elements arranged upon and supported by said base surface, said elements abutting one another in an interfitting and side by side relationship, each element being of considerable height and having peripheral walls and intersecting partitions dividing said element into a plurality of vertically arranged passageways, the cross-sectional area of each passageway being larger than that of the hoof of the livestock to be restrained thereby, the upper surfaces of the partitions and peripheral walls forming a road bed for vehicles and humans.

3. A livestock guard forming unit adapted to be used in multiple to construct guards of different widths and lengths comprising a box-like element of considerable height having peripheral walls and intersecting partitions dividing said element into a plurality of vertically arranged passageways, the cross-sectional area of each passageway being larger than that of the hoof of the livestock to be restrained thereby.

References Cited in the file of this patent

UNITED STATES PATENTS

| | | |
|---|---|---|
| 148,818 | Goodridge | Mar. 24, 1874 |
| 928,192 | Hammill | July 13, 1909 |
| 1,633,192 | Reagan | June 21, 1927 |
| 1,886,404 | Kipple | Nov. 8, 1932 |
| 2,471,551 | Slaughter | May 31, 1949 |